W. A. CAMPBELL.
NURSING STOVE.
APPLICATION FILED APR. 27, 1906.
988,077.
Patented Mar. 28, 1911.
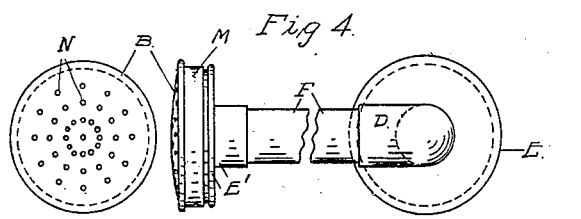
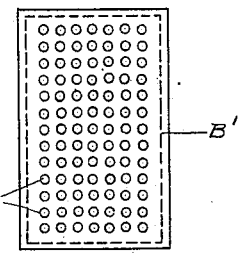
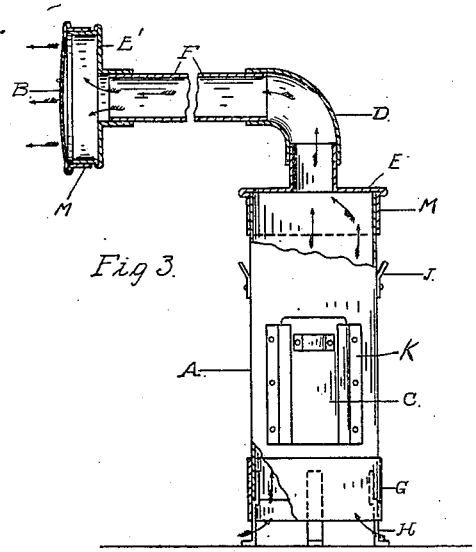
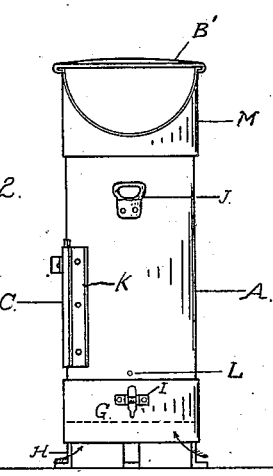
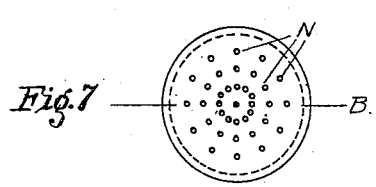
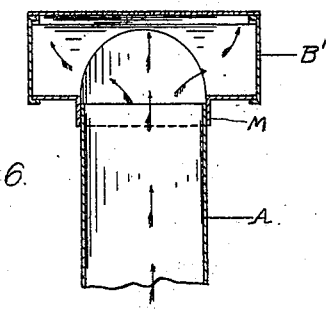
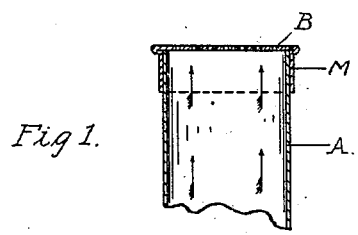
Witnesses
Paul K. Strong
Reuben A. Kettle
Inventor
William A. Campbell

@# UNITED STATES PATENT OFFICE.

WILLIAM A. CAMPBELL, OF KENTON, OHIO.

NURSING-STOVE.

988,077.

Specification of Letters Patent. Patented Mar. 28, 1911.

Application filed April 27, 1906. Serial No. 314,047.

*To all whom it may concern:*

Be it known that I, WILLIAM A. CAMPBELL, a citizen of the United States, residing at Kenton, in the county of Hardin and State of Ohio, have invented a new and Improved Nursing-Stove, of which the following is a specification.

The improvements relate to the original disclosures of my application for a nursery heating and drying apparatus, which was filed August 16, 1905, Serial No. 274,384, upon which the new matter has been added, and consists in the disclosure of an adjustable collar damper, G, surrounding the lower portion of the body or casing A; of a slidable cover C, for an opening in the convex surface of said body, A, and handles upon the said body; of a modified form of a removable heat off-take for the discharging end of body A as disclosed in the said application.

The object and nature of the invention are the same as originally disclosed in the said application and being especially designed for use in combination with oil or spirit lamps, and gas burners; and to provide a nursing contrivance whereby all the various uses of heat required can be quickly and practically applied.

The invention consists in the novel combination of the interchangeable arrangement of the parts designed to suit the various purposes and uses of heat, as will be hereinafter fully set forth and pointed out in the claims.

Reference is to be had to the accompanying drawings forming a part of the specification, in which similar letters of reference indicate corresponding parts in all the views.

Figure 1 is a sectional elevation of the contrivance illustrating it with a circular distributing off-take arranged for heating water, food and air. Fig. 2 is a side elevation of the contrivance, illustrating it with a semi-cylindrical heat distributing off-take arranged for drying hair and clothing. Fig. 3 is a front elevation and sectional view of the contrivance, illustrating the parts arranged for applying heat to a patient. Fig. 4 is a top view of the contrivance, shown in Fig. 3. Fig. 5 is a top view of the semi-cylindrical heat distributing off-take, illustrating it perforated. Fig. 6 is a sectional elevation of the body or casing with a longitudinal sectional view of the semi-cylindrical heat distributing off-take. Fig. 7 is a plan view illustrating the off-take B in Fig. 1 perforated. Fig. 8 is an end view of off-take B illustrating it perforated in Figs. 3 and 4.

In the practical construction of my nursing contrivance, the same consists of light sheet metal with the several parts designed for being readily and interchangeably connected to suit the specific requirement desired. This nursing contrivance essentially embodies a detachable heat off-take formed with a flanged heat intake and perforated discharge, detachable flue sections and a body or casing, which latter may be fitted over an oil or spirit lamp or a gas burner. The interchangeable nature of the contrivance being the said detachable off-take, which is adapted to be detachably connected directly with the discharge end of the body or casing, or indirectly by means of the said detachable flue sections, which are adapted to coöperate with the discharge end of said body or casing and the heat intake of the detachable off-take, by which the position of the perforated surface of the heat off-take with respect to the discharge end of the body or casing may be changed, and the distributing element used for the purposes required.

In the preferred and improved construction of my nursing contrivance, I employ a shell like body, preferably a cylindrical casing indicated at A, open at its top and its bottom, and having means H, whereby the bottom is held sufficiently above the floor to provide for a proper in-feed of air, the amount of which may be regulated by an adjustable collar damper, indicated by G, which surrounds the lower portion of the said casing A, and the collar having a spring fastening shown at I, whereby the collar may be adjusted and secured to perforations in the casing shown by L in Fig. 2. The casing is also provided with an opening in the convex surface whereby access may be had to adjust the flame of a burner over which the casing may be placed, and this opening having at its edges side strips, which form guideways indicated at K, into which a cover C is slidably adjusted. This casing A is provided with handles shown at J and a detachable heat distributing off-take formed with a flanged heat intake indicated at M and perforated discharge shown at N. Said off-take is adapted to be fitted over the top of the casing and being detachable, off-takes of different forms may be interchangeably employed, illustrated by B, B' and the flue section E, as shown in Figs. 1, 2, 3 and 6 of the drawings. Intermediate detachable flue sections are shown by the letters D, E, E' and F, which are adapted to coöperate with the open top of the casing and the flanged heat intake of the distributing off-take whereby the position of its perforated surface may be changed, as shown in Fig. 3 of the drawings.

The operative arrangements of the stove are as follows: When a direct and a greater degree of heat is needed to warm water, food and air, the off-take B is employed for the top of casing, shown in Fig. 1; and when a greater heat surface is required for drying the hair or clothing of a patient the off-take B being removed, the off-take B' may be alternately employed thereon; and when heat is desired to warm a bed or to apply heat to a patient, the off-take B' is removed and the off-take E' of flue section is employed with other intermediate detachable flue sections D, E' and F, which are adapted to coöperate with the top of the casing and the heat intake of the distributing off-take by which the position of its perforated surface may be changed and the distributing element from a generating burner may be discharged, as shown in Fig. 3 of the drawings.

Having thus described my invention, what I claim and desire to secure by Letters Patent, is:—

1. In a nursing stove of the nature described, in combination with a body or casing, open at its top and at its bottom, means for supporting the said body above the floor to form an air space; of an adjustable collar damper surrounding the lower portion of the said body, said damper provided with a spring fastening and arranged to control the admission of air into the said space, said body adapted to be set over a heat source; of a detachable heat distributing off-take formed with a flanged heat in-take and perforated discharge for the top of the said body, said off-take being removable whereby off-takes of different forms may be interchangeably employed for the purposes as substantially set forth.

2. In a nursing stove of the nature described, in combination with a body or casing open at its top and at its bottom and the convex surface provided with an opening and guideways, means for supporting the said body above the floor to form an air space; said body adapted to be set over a heat source; of a slidable cover for the opening in the convex surface of the said body, said cover fitted in guideways and arranged to admit of access to regulate the flame of a burner; an adjustable collar damper surrounding the lower portion of the said body arranged to regulate admission of air into the said space; of a detachable heat off-take formed with a flanged heat intake and perforated discharge, and intermediate removable flue sections adapted to coöperate with the discharge end of the said body and the flanged intake of the said distributing off-take, by which the distributing element may be conducted indirectly through the said flue sections and whereby the position of the perforated surface of the said off-take with respect to the said body may be changed for the purposes, as substantially set forth.

3. In a nursing stove of the nature described, in combination with a body or casing open at its top and at its bottom and the convex surface provided with an opening and guideways, means for supporting the said body above the floor to form an air space, an adjustable collar damper provided with a spring fastening bar having one end bent to form a pin, said damper surrounding the lower portion of the said body, said portion being perforated into which the pin of the said fastening may be inserted to secure the adjustment of the said damper by means of the said perforation in the said body, a cover for an opening in the said body and a detachable heat distributing off-take for the top of said body; of a heat generating burner, said burner being removable whereby burners of different forms may be interchangeably employed as a heat source, as substantially set forth.

WILLIAM A. CAMPBELL.

Witnesses:
JOHN Y. THOMPSON,
JAMES WATT.

---

Copies of this patent may be obtained for five cents each, by addressing the "Commissioner of Patents, Washington, D. C."